(12) United States Patent
Mondor

(10) Patent No.: US 6,982,586 B2
(45) Date of Patent: Jan. 3, 2006

(54) SYSTEMS AND METHODS FOR CLOCK GENERATION USING HOT-SWAPPABLE OSCILLATORS

(75) Inventor: Robert M. Mondor, Sutton, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/805,863

(22) Filed: Mar. 22, 2004

(65) Prior Publication Data

US 2005/0206428 A1    Sep. 22, 2005

(51) Int. Cl.
*G06F 1/04* (2006.01)

(52) U.S. Cl. ..................... 327/291; 327/292

(58) Field of Classification Search ............... 327/291, 327/292, 293, 294, 295, 296, 297, 298; 375/354, 375/356; 714/4, 11
See application file for complete search history.

(56) References Cited

U.S. PATENT DOCUMENTS

| | | | |
|---|---|---|---|
| 4,218,771 A | 8/1980 | Hogge, Jr. ................. 375/120 |
| 4,520,489 A | 5/1985 | Hogge, Jr. ................. 375/14 |
| 4,535,459 A | 8/1985 | Hogge, Jr. ................. 375/14 |
| 4,538,283 A | 8/1985 | Hogge, Jr. ................. 375/14 |
| 4,555,789 A | 11/1985 | Hogge, Jr. ................. 375/14 |
| 4,587,653 A | 5/1986 | Hogge, Jr. ................. 371/6 |
| 4,724,401 A | 2/1988 | Hogge, Jr. et al. ......... 331/4 |
| 4,788,512 A | 11/1988 | Hogge, Jr. et al. ......... 331/4 |
| 5,436,405 A | 7/1995 | Hogge, Jr. et al. ......... 174/35 |
| 5,596,804 A | 1/1997 | Hogge, Jr. et al. ......... 29/840 |
| 6,349,391 B1 * | 2/2002 | Petivan et al. ............ 714/11 |
| 6,757,350 B1 * | 6/2004 | Chesavage .............. 375/376 |

* cited by examiner

*Primary Examiner*—Linh My Nguyen

(57) ABSTRACT

In one embodiment, a clock generation system comprises a redundant clock source (RCS) device for receiving multiple timing signals and for generating at least one clock from the timing signals for distribution to other circuits, and first and second hot-swappable oscillator (HSO) devices that each comprise a base housing and an oscillator unit for generating a timing signal, the base housing including an interconnect for coupling to the oscillator unit, the interconnect providing a first connection for the timing signal and providing a second connection to enable detection of insertion and removal of the oscillator unit, wherein the RCS device switches between timing signals from the first and second HSO devices in response to oscillator unit removal detected through the interconnect and switches between timing signals in response to timing signal failure.

20 Claims, 3 Drawing Sheets

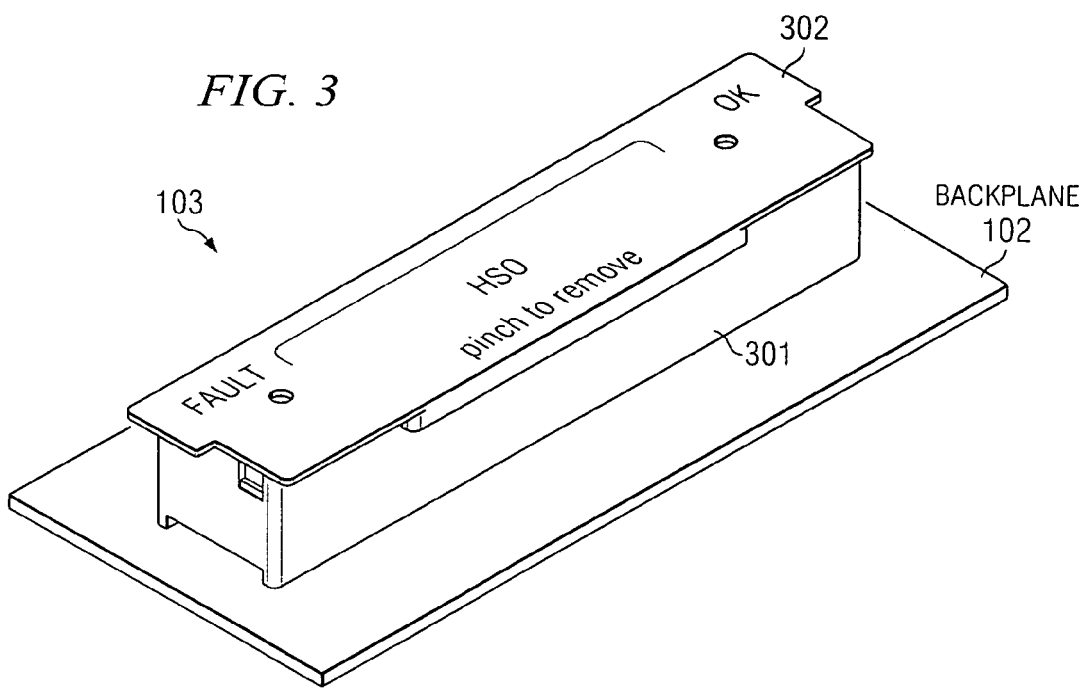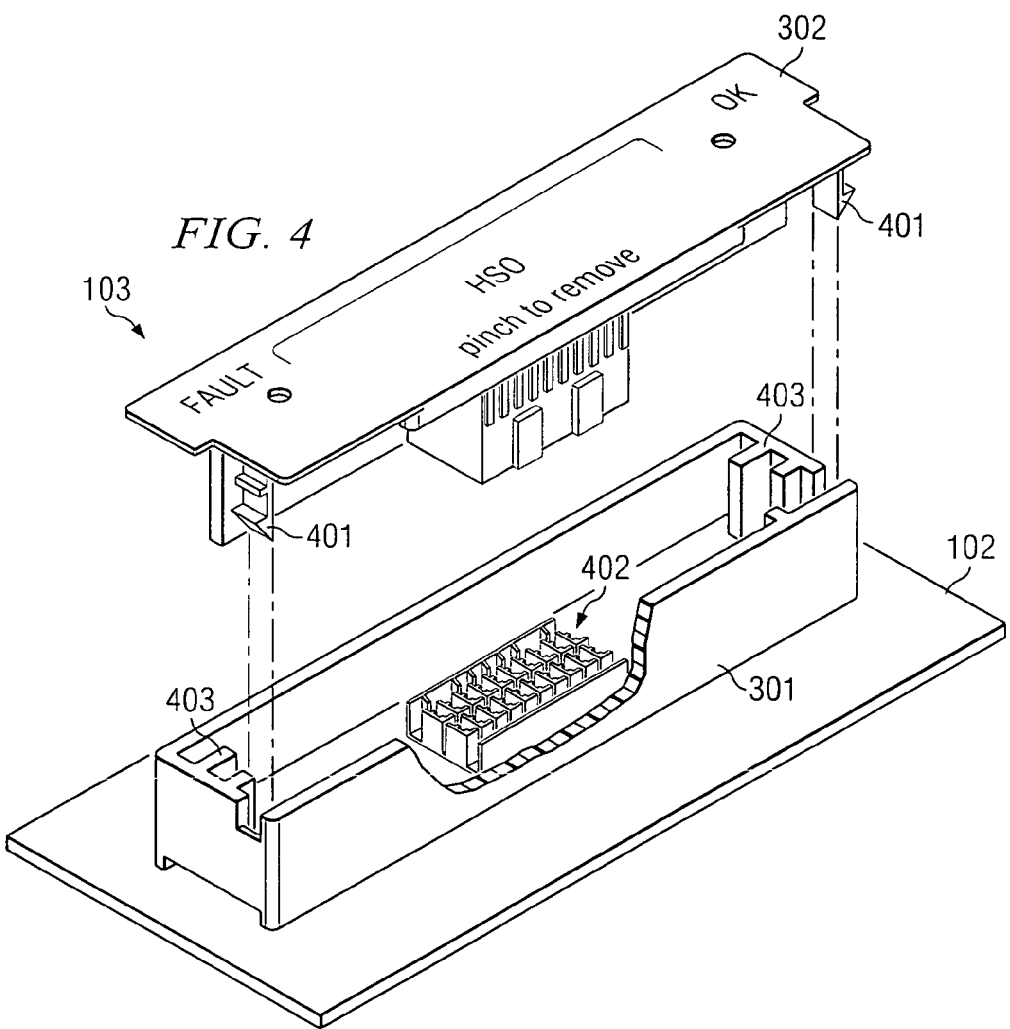

SYSTEMS AND METHODS FOR CLOCK GENERATION USING HOT-SWAPPABLE OSCILLATORS

DESCRIPTION OF RELATED ART

Electronic equipment systems employ clock sources to control the timing of logic components within the systems. In traditional systems, a clock generation module or card is employed on the backplane of the system to distribute timing signals through the backplane to each chassis card. The clock generation module may include an oscillator crystal driving a phase-locked loop. The clock generation module may also possess various filtering circuits and clock duplication functionality. From the clock generation module, the clocks are distributed to the other cards of the system to control the timing of logical events.

The traditional approach created a single point of failure for the supported system. Specifically, if the clock module malfunctioned for any reason, the entire system would cease to function. Accordingly, redundant clock generation designs have been implemented. In one example, a clock generation module includes two oscillator crystals. During ordinary operation, one of the oscillator crystals is used as a master device to generate the clock for distribution and the other oscillator operates in synchronization. If the master oscillator fails for any reason, circuitry within the clock module detects the failure and switches the clock generation to the timing signal generated by the secondary oscillator.

SUMMARY

In one embodiment, a clock generation system comprises a redundant clock source (RCS) device for receiving multiple timing signals and for generating at least one clock from the timing signals for distribution to other circuits, and first and second hot-swappable oscillator (HSO) devices that each comprise a base housing and an oscillator unit for generating a timing signal, the base housing including an interconnect for coupling to the oscillator unit, the interconnect providing a first connection for the timing signal and providing a second connection to enable detection of insertion and removal of the oscillator unit, wherein the RCS device switches between timing signals from the first and second HSO devices in response to oscillator unit removal detected through the interconnect and switches between timing signals in response to timing signal failure.

In another embodiment, a method of performing clock generation for electronic equipment comprises coupling a redundant clock source (RCS) to a backplane, coupling a plurality of hot-swappable oscillator (HSO) units to the backplane through respective multi-level interconnects, each of the multi-level interconnects providing a first level for connecting a timing signal and providing a second level to enable detection of insertion and removal of a respective HSO unit, generating, by the RCS, a clock for distribution through the backplane from a timing signal received from one of the HSO units, detecting, by the RCS, disconnection of the second level of one of the multi-level interconnects by the redundant clock source, and switching, by the RCS, to a timing signal from another HSO unit for generation of the clock before the respective timing signal from the HSO unit associated with the disconnection becomes unavailable.

In another embodiment, a clock generation system comprises a redundant clock source (RCS) means for receiving multiple timing signals and generating at least one clock using one of the timing signals, and a plurality of hot-swappable oscillator (HSO) means for providing the timing signals to the RCS means, wherein each HSO means comprises an oscillator unit for generating a respective timing signal and a base housing having a first level of an interconnect for communication of the respective timing signal and a second level of the interconnect for communication of a signal indicative of whether the oscillator unit is fully engaged with the interconnect, wherein the RCS means switches between timing signals from the plurality of HSO means in response to detection of removal of an oscillator unit from a respective interconnect.

BRIEF DESCRIPTION OF THE DRAWINGS

FIG. 3 depicts a fully assembled hot-swappable device coupled to a backplane according to one representative embodiment.

FIG. 4 depicts a disassembled hot-swappable device according to one representative embodiment.

DETAILED DESCRIPTION

Representative embodiments are directed to providing hot-swappable oscillators to implement a redundant clock distribution system. In one representative embodiment, a redundant clock source element receives timing signals from a plurality of hot-swappable oscillator devices. The redundant clock source element utilizes the timing signal of one of the hot-swappable oscillators to distribute one or several clocks to a backplane of a computer system or other suitable electronic equipment. The redundant clock source processes the received timing signal to ensure that the respective oscillator device is functioning properly. If the oscillator device ceases to function or begins to function improperly, the redundant clock source switches to a timing signal from another hot-swappable oscillator device. Also, the redundant clock source detects the process of removal of a hot-swappable device before the hot-swappable device ceases to communicate its timing signal. If the hot-swappable oscillator device being removed is currently supplying the timing signal for clock distribution, the redundant clock source element switches to a timing signal from another hot-swappable oscillator device.

In one representative embodiment, hot-swappable oscillator devices are implemented using an oscillator card, device cover, and device housing. The oscillator card holds an oscillator unit that has an oscillator crystal used to generate a timing signal and an interconnect. The oscillator card is coupled to a device cover using suitable fasteners. The device housing also couples to the backplane of a computer system using suitable fasteners. The device cover is adapted to mechanically couple to the device housing using latching structures. Furthermore, the device housing comprises an interconnect corresponding to the interconnect to the oscillator unit. When the oscillator card is inserted into the device housing by placement of the device cover, the corresponding interconnects enable power to be received by the oscillator unit and the timing signal to be communicated to the backplane.

Furthermore, the corresponding interconnects of the device housing and the oscillator unit possess multiple levels. The multiple levels enable the removal of the oscillator card to be detected before the portions of the interconnects that communicate the timing signal lose contact. Specifically, a lower level of the interconnects enables a detection path to be established. If the detection path enables communication of a signal from the hot-swappable oscillator device to the redundant clock source element, it is assumed that the hot-swappable oscillator device is present. However, if the detection path is interrupted and the communication of the signal ceases, it is assumed that the hot-swappable oscillator device is being removed and the redundant clock source element switches to the timing signal of another hot-swappable oscillator device.

Figure 1:
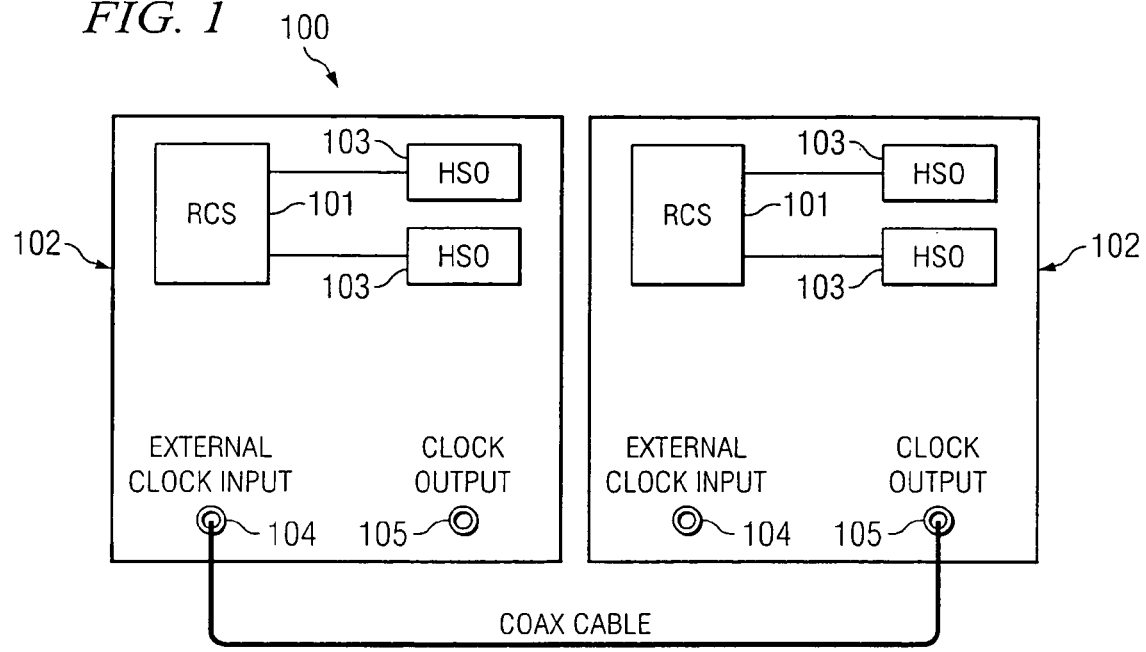
FIG. 1 depicts a plurality of clock generation systems according to one representative embodiment

Referring now to the drawings, FIG. 1 depicts a plurality of clock generation systems 100 according to one representative embodiment. Each system 100 includes redundant clock source 101 attached to backplane 102. Backplane 102 is a circuit board that contains sockets or expansion slots where other computer boards can be connected. Redundant clock source 101 receives multiple timing signals. From one of the timing signals, redundant clock source 101 generates a clock for distribution through backplane 102 for provision to suitable circuits and devices. Redundant clock source 101 may perform electrical filtering of the clock as appropriate. Furthermore, redundant clock source 101 may perform clock duplication depending upon the number of clocks supported by a given system or platform. When providing multiple clocks, redundant clock source 101 may perform multiplication and division of the clock frequency as appropriate for particular system specifications. Also, system 100 may include input port 104 for receiving a clock signal from another backplane to enable synchronization of clocks. Likewise, system 100 may include output port 105 for this purpose.

A plurality of hot-swappable oscillator devices 103 communicate respective timing signals generated by their crystal oscillators through backplane 102 to redundant clock source 101. Furthermore, respective signals are communicated from hot-swappable oscillator devices 103 to redundant clock source 101 indicating whether hot-swappable oscillator devices 101 are fully connected to backplane 102 as will be discussed in greater detail below.

Figure 2:
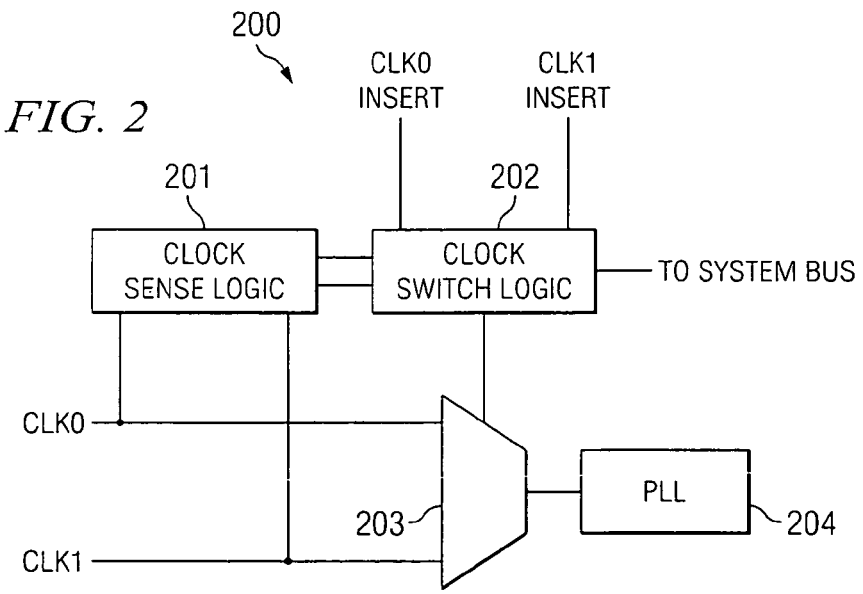
FIG. 2 depicts a circuit for inclusion within a redundant clock source according to one representative embodiment.

FIG. 2 depicts circuit 200 for inclusion within redundant clock source 101 according to one representative embodiment. Circuit 200 processes the timing signals (shown as CLK0 and CLK1) received from hot-swappable oscillator devices 103. Specifically, circuit 200 switches between the two signals as appropriate using, for example, multiplexer 203 to drive phase-locked loop 204. The clock or clocks for distribution are derived from the output of phase-locked loop 204.

Circuit 200 selects the respective timing signal using clock sense logic 201 and switch logic 202. Clock sense logic 201 determines the signal characteristics of the timing signals. If a timing signal exhibits jitter or any other undesirable characteristic, clock sense logic 201 communicates a signal to switch logic 202 to indicate that the respective timing signal should not be used to derive the clock(s). Switch logic 202 responds by causing the other timing signal to be provided to phase-locked loop 204.

Switch logic 202 further controls the provision of timing signals to phase-locked loop 204 in response to insertion and removal of hot-swappable oscillator devices 103. When a first hot-swappable oscillator device 103 is fully engaged, a suitable signal (CLK0 INSERT or CLK1 INSERT) is communicated to switch logic 202. Switch logic 202 causes the timing signal from the inserted hot-swappable oscillator device 103 to be provided to phase-locked loop 204. After two hot-swappable oscillator devices 103 have been inserted, switch logic 202 responds to the removal of one of the hot-swappable oscillator devices 103. When one of the signals CLK0 INSERT and CLK1 INSERT is no longer provided to switch logic 202, switch logic 202 causes the timing signal associated with the other hot-swappable oscillator 103 to be provided to phase-locked loop 204.

If a hot-swappable oscillator device 103 is detected as providing a timing signal with an undesirable characteristic or is detected as removed, switch logic 202 communicates a suitable signal through the system bus. The signal may be detected by the operating system to indicate to an administrator that appropriate action should be taken.

FIG. 3 depicts a fully assembled hot-swappable device 103 coupled to backplane 102 according to one representative embodiment. As seen in FIG. 3, hot-swappable device 103 includes base housing 301 that is mechanically coupled to backplane 102. Cover element 302 is inserted within base housing 301. Base housing 301 and cover element 302 enclose the oscillator crystal and related circuitry. Cover element 302 includes a plurality of light emitting diodes (LEDs) to indicate the functional state of hot-swappable oscillator 103.

If the oscillator of hot-swappable oscillator 103 ceases to function properly, cover element 302 can be removed from base housing 301 by manual depression of the side walls of cover element 302. Specifically, application of pressure displaces latches 401 thereby releasing cover element 302 as shown in FIG. 4. As seen by the removal of cover element 302, base housing 301 includes guides 403 for receiving a circuit board to which an oscillator unit is attached. Guides 402 align the oscillator unit to be coupled within header 402.

Header 402 provides a multi-level interconnect. One of the levels of the interconnect enables the presence of the oscillator unit (not shown) to be detected. A second level of the interconnect enables the timing signal generated by the oscillator unit to be communicated to redundant clock source 101 through backplane 102. The first level of the interconnect is shorter than the second level. When the oscillator unit is being removed from header 402, the first level of the interconnect is disconnected first. Accordingly, redundant clock source 101 switches timing signals in response to the disconnection of the first level of the interconnect of header 402 before the second level of the interconnect loses contact.

Figure 5:
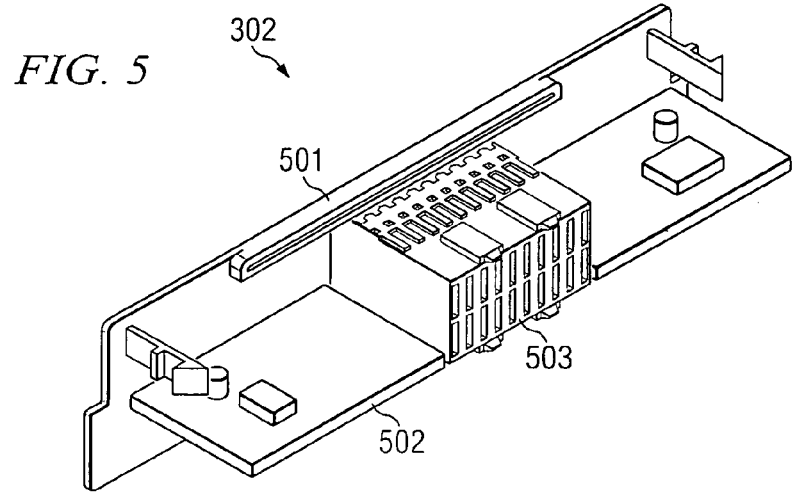
FIG. 5 depicts a cover element according to one representative embodiment.

FIG. 5 depicts a "rear" view of cover element 302 that includes mechanical portion 501, circuit board 502, and oscillator unit 503. Oscillator unit 503 is coupled to circuit board 502. Oscillator unit 503 includes the oscillator crystal and related circuitry. Oscillator unit 503 also includes an interconnect for coupling with header 402. Circuit board 502 may be coupled to mechanical portion 501 using plastic rivets or other suitable fasteners.

Figure 6:
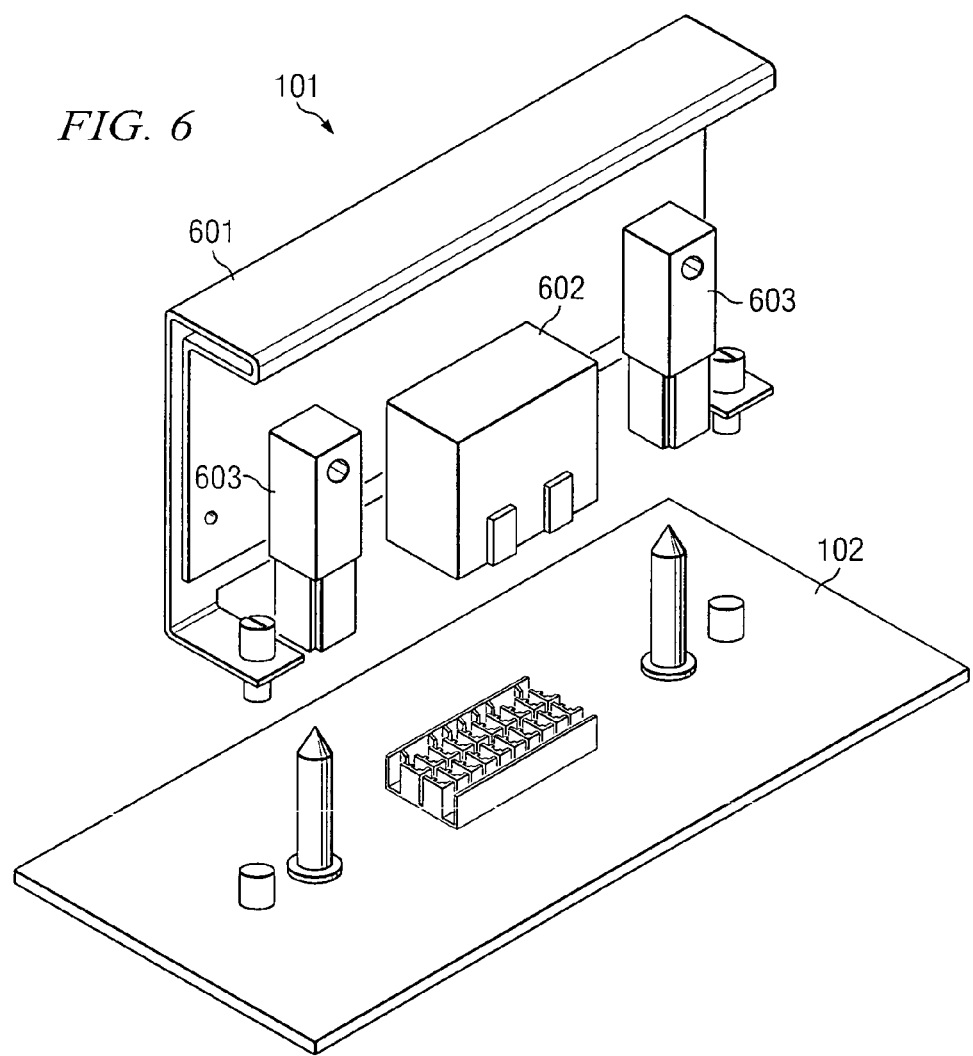
FIG. 6 depicts a redundant clock source implemented according to one representative embodiment.

In another representative embodiment, redundant clock source 101 is implemented to be connected to backplane 102 in a manner that is similar to the connection of hot-swappable oscillators 103. FIG. 6 depicts redundant clock source 101 implemented in this manner. Redundant clock source 101 includes circuit board 601 to which redundant clock source unit 602 is attached. Redundant clock source unit 602 encloses the clock processing circuitry for coupling with an interconnect. Redundant clock source 101 further includes alignment structures 603 to facilitate attachment of redundant clock source 101 during coupling with the interconnect.

Representative embodiments enable redundant clock distribution to electronic equipment to occur. If an oscillator unit fails, the electronic equipment continues to function without interruption. Accordingly, representative embodiments increase the availability of computer servers, telecom equipment, and/or the like. Furthermore, when an oscillator unit fails, the electronic system need not be taken offline to service the failed oscillator unit. Instead, representative embodiments enable a hot-swappable oscillator device to be removed from the system during operation of the system. Moreover, the mechanical implementation causes the replacement of a failing hot-swappable oscillator device to occur in an efficient manner. An LED on the oscillator device signals to the field technician which devices should be replaced. Also, the oscillator unit can be easily retrieved by manual depression of the device housing. Furthermore, the oscillator unit can be replaced by switching out circuit boards from the device cover.

What is claimed is:

1. A clock generation system, comprising:
   a redundant clock source (RCS) device for receiving multiple timing signals and for generating at least one clock from said timing signals for distribution to other circuits; and
   first and second hot-swappable oscillator (HSO) devices that each comprise a base housing and an oscillator unit for generating a timing signal, said base housing including an interconnect for coupling to said oscillator unit, said interconnect providing a first connection for said timing signal and providing a second connection to enable detection of insertion and removal of said oscillator unit;
   wherein said RCS device switches between timing signals from said first and second HSO devices in response to oscillator unit removal detected through said interconnect and switches between timing signals in response to timing signal failure.

2. The clock generation system of claim 1 further comprising:
   an external input port for receiving a clock from another circuit, wherein said RCS synchronizes said at least one clock to said received clock.

3. The clock generation system of claim 1 further comprising:
   an external output port for providing said at least one clock to another circuit.

4. The clock generation system of claim 1 wherein each of said first and second HSO devices comprises a cover element that has an oscillator board coupled to said oscillator unit.

5. The clock generation system of claim 4 wherein said base housing comprises guide structure for receiving said oscillator board to align said oscillator unit to couple with said interconnect.

6. The clock generation system of claim 4 wherein said cover element comprises a plurality of latches for mechanically coupling said cover element to said base housing that are releasable by manual depression.

7. The clock generation system of claim 4 wherein said cover element comprises a light emitting element to indicate a functional state of said oscillator unit.

8. The clock generation system of claim 1 wherein said RCS device is implemented on a circuit board coupled to a backplane circuit board.

9. A method of performing clock generation for electronic equipment, comprising:
   coupling a redundant clock source (RCS) to a backplane;
   coupling a plurality of hot-swappable oscillator (HSO) units to said backplane through respective multi-level interconnects, each of said multi-level interconnects providing a first level for connecting a timing signal and providing a second level to enable detection of insertion and removal of a respective HSO unit;
   generating, by said RCS, a clock for distribution through said backplane from a timing signal received from one of said HSO units;
   detecting, by said RCS, disconnection of said second level of one of said multi-level interconnects by said redundant clock source; and
   switching, by said RCS, to a timing signal from another HSO unit for generation of said clock before said respective timing signal from said HSO unit associated with said disconnection becomes unavailable.

10. The method of claim 9 further comprising:
    providing said clock to an external port for communication to another backplane.

11. The method of claim 9 further comprising:
    receiving a timing signal from another backplane; and
    synchronizing, by said RCS, said clock to said timing signal.

12. The method of claim 9 wherein said coupling a plurality of HSO units comprises:
    inserting cover elements of said HSO units into base housing units that are mechanically fastened to said backplane.

13. The method of claim 12 wherein each base housing unit comprises guide structures to receive a circuit card of a respective cover element to align said circuit card to couple with a respective multi-level interconnect.

14. The method of claim 12 wherein each cover element comprises a plurality of latches for mechanically coupling said cover element to a respective base housing unit.

15. The method of claim 12 further comprising:
    releasing a cover element of an HSO unit by manual depression of said plurality of latches.

16. The method of claim 12 wherein each cover element comprises a light emitting element to indicate a functional state of timing signal generation.

17. The method of claim 12 wherein said coupling said RCS comprises:
    coupling a circuit board containing circuitry for clock generation to said backplane.

18. A clock generation system, comprising:
    a redundant clock source (RCS) means for receiving multiple timing signals and generating at least one clock using one of said timing signals; and
    a plurality of hot-swappable oscillator (HSO) means for providing said timing signals to said RCS means, wherein each HSO means comprises an oscillator unit for generating a respective timing signal and a base housing having a first level of an interconnect for communication of the respective timing signal and a second level of said interconnect for communication of a signal indicative of whether the oscillator unit is fully engaged with said interconnect;
    wherein said RCS means switches between timing signals from said plurality of HSO means in response to detection of removal of an oscillator unit from a respective interconnect.

19. The clock generation system of claim 18 wherein said RCS means and said plurality of HSO means are coupled to a common backplane circuit board.

20. The clock generation system of claim 18 wherein each base housing comprises guide structures for aligning a respective oscillator unit for insertion with the interconnect.

* * * * *